US005671285A

United States Patent [19]
Newman

[11] Patent Number: 5,671,285
[45] Date of Patent: Sep. 23, 1997

[54] SECURE COMMUNICATION SYSTEM

[76] Inventor: Bruce D. Newman, 55 Nutmeg Dr., Carmel, N.Y. 10512

[21] Appl. No.: 571,503

[22] Filed: Dec. 13, 1995

[51] Int. Cl.$^6$ .............................. H04L 9/30; H04L 9/00; H04N 1/44

[52] U.S. Cl. .............................. 380/30; 380/9; 380/18; 380/49

[58] Field of Search .............................. 380/4, 9, 18, 30, 380/49, 50, 23, 24, 25

[56] References Cited

U.S. PATENT DOCUMENTS

| | | | |
|---|---|---|---|
| 4,771,461 | 9/1988 | Matyas | 380/24 |
| 4,864,616 | 9/1989 | Pond et al. | 380/25 |
| 4,881,263 | 11/1989 | Herbison et al. | 380/21 |
| 4,969,189 | 11/1990 | Ohta et al. | 380/25 |
| 4,977,595 | 12/1990 | Ohta et al. | 380/24 |
| 5,136,647 | 8/1992 | Haber et al. | 380/25 |
| 5,224,162 | 6/1993 | Okamoto et al. | 380/24 |
| 5,337,358 | 8/1994 | Axelrod et al. | 380/23 |
| 5,343,529 | 8/1994 | Goldfine et al. | 380/23 |
| 5,420,926 | 5/1995 | Low et al. | 380/24 |
| 5,440,634 | 8/1995 | Jones et al. | 380/24 |
| 5,446,796 | 8/1995 | Ishiguro et al. | 380/24 |
| 5,502,765 | 3/1996 | Ishiguro et al. | 380/24 |
| 5,511,121 | 4/1996 | Yacobi | 380/24 |

OTHER PUBLICATIONS

Kowalchuk et al., Communications Privacy: Integration of Public and Secret Key Cryptography, Conference NTC '80 IEEE Houston TX, Nov. 30, 1980.

*Primary Examiner*—Bernarr E. Gregory
*Attorney, Agent, or Firm*—Carl C. Kling

[57] ABSTRACT

Encryption/decryption capable terminal units, such as FAX point-of-sale units, on non-secure telecommunications, use public keys for accessing selected target terminals, but make their messages secure by encryption according to private keys. Each subscriber terminal registers, with a central database controller, a unique public key code. Each terminal includes a quick-access storage for a finite number of telephone numbers and related public keys for other terminals. To send a message, the source FAX first queries its local storage for the public key of the target terminal. If the public key is present, it sends a message encrypted with the public key for the target terminal, along with a digital signature. When the message is transmitted, the encrypted public key for the target terminal, and the digital signature of the source terminal user's private key are combined to form a message packet for decryption by the target terminal. The target terminal queries its own key storage to permit decrypting using its own private key and the public key of the sender. The central database controller provides unknown telephone numbers and public keys, and archives, groups, forwards and timestamps messages, and authorizes credit card transactions, without forwarding credit card numbers and without capability to decrypt such message. Credit transactions require the central database controller to communicate separately with the credit provider, but these messages may be similarly encrypted using the public key and private key concept.

12 Claims, 2 Drawing Sheets

STEP 1 — C->M

| CUSTOMER | ITEMS |
|---|---|

STEP 2 — M->C

| OID# | $ | CDB PUBKEY |
|---|---|---|

STEP 3 — C-**->M

| OID# | $ | OID# | CREDIT CARD INFO CDB PUBKEY |
|---|---|---|---|

STEP 4 — M -**-> CDB

| $ | OID# | CREDIT CARD INFO CDB PUBKEY |
|---|---|---|

STEP 5 — CDB -***->CCC

| $ | CREDIT CARD INFO |
|---|---|

STEP 6

| OID# | $ | OK / NAY |
|---|---|---|

STEP 7 — M->C

| OID# | $ | OK / NAY |
|---|---|---|

SECURE COMMUNICATION SYSTEM

BACKGROUND OF THE INVENTION

1. Field of the Invention

This invention relates to the encrypted transmission of information, and more particularly relates to a secure communication system and method, with encryption/decryption capability, together with backup storage, call forwarding, date-stamping, purchase order secure processing, and a number of other features, all of high quality at low cost, for retrofitting into existing computers, FAX cards and FAX machines, modems and other communication adapters, and for providing new FAX units and computers with secure communication capability over non-secure communication channels.

2. Description of Related Art

The FAX machine is becoming standard equipment in the office and even in the home. A great number of important messages are sent by FAX; color FAX is available: encrypted FAX is available. It is known, for example, to send an encrypted FAX to a known recipient, using the public key of that recipient, and using a mutually known private key to decrypt. This is acceptable encryption in that it is hard to beaks the code—but it suffers in that it requires a great deal of housekeeping to keep the list of public keys up-to-date, to maintain the privacy of the public keys, and to verify the authenticity of the sender and receiver.

The Public Key Concept

Public key cryptography, first developed in the late 1970's, uses a matched pair of keys—on private and one public key. The public key is not widely disseminated like a phone number listed in the telephone book; it is provided on demand to an authorized caller following a secure verification procedure. The public key can, however, be transmitted via non-secure public telephone lines. Each key transforms the data in one direction so that what one key encrypts, the other key decrypts, and vice versa. For example, a person with a public key can encrypt a message, but cannot decrypt it. Only someone with the private key can decrypt that message. An analogy can be made with a mail slot in a door. Anyone can place the mail (or pass messages) through the mail slot, but only someone with the private key can retrieve (and read) them.

Digital signatures provide a means of verifying the identity of the message sender by "signing" the encrypted document with a private key. Typically, a digital signature is implemented by computing a message digest of the message and then encrypting this digest with the private key. The message and message digest may be decrypted by using the public key, but since only the sender has access to his or her private key, it could not have been created (i.e., signed) by anyone else. It could also not have been modified or tampered with since decryption of this highly encrypted message would only result in gibberish.

It is a major problem for any user of existing FAX encryption/decryption systems to receive periodic notification of even the existence of a new (or newly updated) similar FAX encryption/decryption unit, and to keep informed of public keys and telephone numbers. Unless the housekeeping burden is met, however, the user is unable to verify that the FAX recipient is the actual target FAX machine, available to the person selected to be the FAX recipient. This is a major failing since verification and constant updating—automatic and after-hours preferred—is an essential part of secure communications. There is a compatibility gap. One type of secure facsimile terminal product will have major compatibility problems with another secure FAX unit, and this compatibility gap will brow as different versions of facsimile terminal units are introduced, and as totally new facsimile terminal products are introduced.

SUMMARY OF THE INVENTION

It is the object of the invention to provide an elegant method for encrypting and decrypting fax data for a high degree of security at low cost, through use of a secure central database, which maintains on-line a universal directory of public codes and respectively related telephone numbers.

Another object of the invention is to provide sophisticated encryption and decryption at the device attached to the subscriber fax machine. This device will be inexpensive, while retaining a high measure of security.

Another object of the invention is to provide a remote "save" and time-stamping service under the control of the central database controller, which can intercept each encrypted fax message and save that fax message, still encrypted and indecipherable by the central database controller or by any intruder into the network.

A feature of the invention is a directory and redirecting capability at the central database controller, which provides addressing capability for public keys beyond the capacity of the user terminal public key storage, and provides conference call style grouping capability of public keys and FAXphone numbers, indexed to subscribe information.

Another feature of the invention is the existence of means of verifying data, digital signatures and public keys, means for timestamping of each FAXed page, means to provide audit trails, means to address pre-formed or ad-hoc grouping of subscribers for group broadcasts, and other features including the easy incorporation of new public keys for FAX machines and FAX cards.

Another advantage is that manufacturers of FAX machines and FAX boards can easily incorporate this security technology directly into their facsimile terminal equipment, providing a standard process in which different types and varieties of equipment can communicate securely with each other. This makes possible a standard interface and protocols in which different types and varieties of security equipment, ranging from FAX to modem to voice communication—including products from different manufacturers—with secure communication, automatically performed and maintained through the central database controller, without human intervention.

An advantage of the invention is the elegant simplicity, using the central database to provide a means of gaining access to the public keys of new users through a highly secure protocol, eliminating the horrendous problem of resetting every one of the existing subscriber terminals each time a new subscriber is added.

Another advantage is the easy control via central database computer storage of public keys and FAXphone numbers of groups of subscribers, or all subscribers, for broadcast facsimile message transmittal with encryption.

Still another advantage ins its simple, secure and inexpensive subscriber hardware, simplicity made possible by use of a local database only for storing the public keys for only a small group of quick-access FAXphone numbers, storing much of the library of subscriber public keys at the central database computer.

Other objects, features and advantages of the invention will be apparent from the following specification and from the annexed drawing and claims.

DETAILED DESCRIPTION OF A PREFERRED EMBODIMENT

Figure 1:
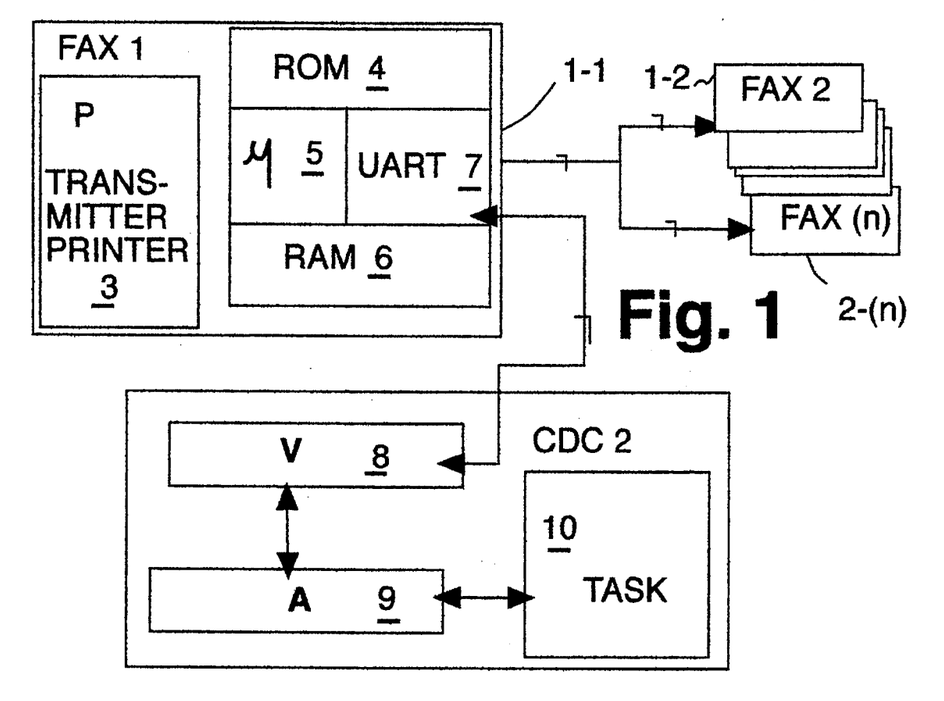
FIG. 1 is a diagrammatic view of the subscriber FAX unit and the network including central database controller.

FIG. 1 shows the connection, which normally is via ordinary commercial telephone lines, between the sending FAX terminal 12 and another FAX terminal or the central database controller 2. For convenience, two subscriber FAX terminals, designated FAX (n) and FAX 2, are identified respectively with reference characters 2–(n) and 2. Subscriber FAX terminals FAX-3 . . . FAX-(n–1) are also available and might be connected. FAX-1 is shown as the sending subscriber terminal. The receiving subscriber terminal FAX 2 is not shown in detail, and other FAX terminals are not shown. Central Database Controller 21 controls communications between facsimile terminals (FAX-1, FAX-2, etc.) Central Database Controller 21 also controls connections to archive storage and does a number of miscellaneous housekeeping and accounting tasks, including, for examples, backup, billing and database management. It also controls an archive memory which can store and time-stamp encrypted facsimile messages indexed to the subscriber. These services, and the providing of subscriber identifiers, may be characterized as "felicitation" in that they are user-friendly services.

NOTE: The FAX terminal may take may forms, including standalone units and a FAX card included in a computer. There is discussion of including a FAX card in a copier. For purposes of this description, the FAX may be identified as a FAX terminal, a FAX unit, a FAX machine, or possibly FAX capability—or, more likely, simply as "FAX."

The FAX-1 unit also includes transmitter/printer unit 3, Read-Only Memory (ROM) 4, microprocessor 5, random-access memory (RAM) 6, and Universal Asynchronous Receiver Transmitter (UART) 7, which is a communications adapter. UART 7 connects to other FAX units, such as FAX-2 1–2 and to Central Database Controller 2.

Central Database Controller (CDC) 2 includes a database (V) 8, containing all of the public keys and associated phone numbers for subscribers. Archive memory (A) 9, and miscellaneous task mechanism (T) 10 are also included in the Central Database Controller System.

Figure 2:
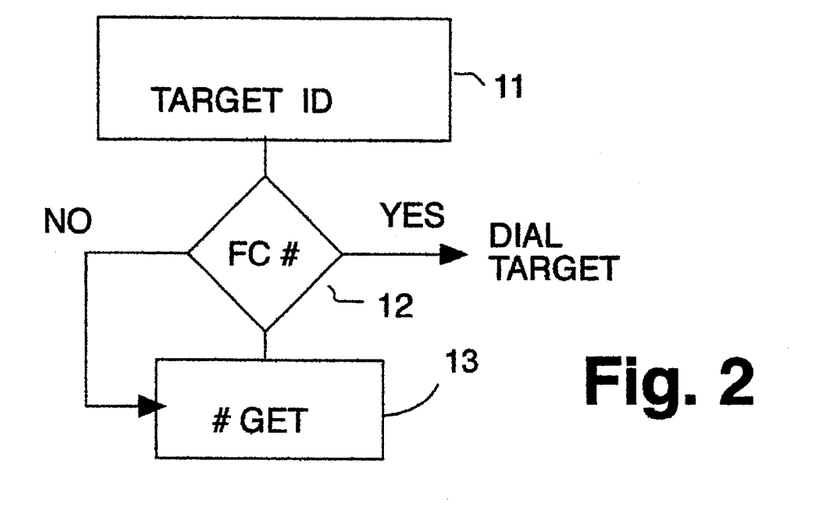
FIG. 2 is a flow diagram showing the portion of the method relating to the quick-access numbers, and alternatively determining to ask the central database controller for the public key indexed to a FAXphone number not stored locally in the hardware of the subscriber FAX unit.

FIG. 2 is a flow diagram showing how the sending subscriber FAX terminal determines whether the target FAX is one of those on the frequently-called list. The FAX operator keys in the TARGET ID, normally the telephone number of the target FAX, as shown by box 11. It checks to see if it already has the number available in its local quick-access number storage, as shown by diamond 123, marked FC #. If YES, the call can be made, under control of a DIAL TARGET signal. If NO, the subscriber terminal must inquire of the Central Database Controller to GET the public key indexed to the target telephone number, as shown by box 13. Once this public key is looked up by the high speed circuits of the Central Database Controller and returned to the subscriber FAX terminal, in this example FAX-1, the DIAL TARGET signal is sent. In most cases, all this happens on-line in such quick succession that the user is unaware of any delay, but perhaps there may be a detectable pause. In the rare event of a failure or overload, it might be necessary to retry after a wait. Such retry techniques are known.

The local database of frequently called numbers consists of the following two fields:

| PHONE NUMBER | PUBLIC KEY |
|---|---|
| AR1 | KR1 |
| AR2 | KR2 |
| . . . | . . . |
| AR(n) | KR(n) |

Implementation at the subscriber FAX terminal is by firmware having the following capabilities:

a) Interpreting standard FAX communication protocols;

b) Accepting public keys and private keys;

c) After-hours remote updating)

d) Capability to store and verify a significant number of public keys.

Implementation at a secure central database site includes the following capabilities:

a) Verification of data;

b) Verification of digital signatures;

c) Time-stamping and secure storage of each encrypted page;

d) Preparation and maintenance of audit trails;

e) Forwarding to a number of user FAX terminals a group broadcast;

f) Accessing the public keys of new and updated users through a highly secure protocol without requiring any end-user interaction.

1. Registering with the Central Database on Startup

The public key and private key are generated at the factory and stored within the individual fax terminal., Following the initial communication with the central database, the public key will be sent and registered with the CDC. This public key and associated telephone number must be securely maintained by the CDC. After transmittal of the information, the following activities occur:

1.1. Validating communication security 1.2. Registering public key 1.3. Acknowledging.

2. Terminal to Terminal Communication with Directory Help From CDC

Each subscribing FAX terminal, including FAX1, FAX2, . . . FAX(n) may be set to a beginning group of "frequently called numbers." Thereafter, whenever there is a call from, or a call to, a new number, there must be a decision whether to treat the number as a "frequently called number." The following activity occurs:

2.1 Validating communication source and destination.

2.2 Requesting public key.

2.3 Receiving public key.

2.4 Storing public key.

2.5 Generating random key (K?) and digital signature.

2.6 Sending (K?) and digital signature.

2.7 Sending encrypted FAX.

3. Terminal to Terminal Communication

When a transmission is made to a FAX unit which is included in the list of frequently called numbers, or if the public key and telephone number are known, the following activity occurs:

3.1 Retrieving public key 3.2 Generating (K?) and digital signature.

3.3 Sending encrypted FAX.

The safe facsimile user terminal FAX1 comprises to functional units as follows:"

1. Hardware—The subscriber facsimile unit 1 includes both random access memory (RAM) 6 and read-only memory (ROM) 4. Representative sizes are two kilobytes RAM and six kilobytes ROM, plus a real-time clock. The unit contains a universal asynchronous receiver transmitter (UART) 7 capable of handling serial communication.

2. firmware—The firmware typically resides in ROM. Much of the firmware in ROM is devoted to encryption/ decryption and digital signature processing required for a secure system. A significant amount of firmware capacity is also dedicated to support of CCITT protocols. Firmware to support the invention includes:

1) Storing and maintaining the local table containing the public keys and telephone numbers;

2) After-hours uploading and downloading of data by interaction with the central database;

3) Automatic initialization with the central database;

3) Providing levels of security;

4) Maintaining an audit trail with automatic backup to the central database.

The user facsimile terminal unit functions as follows:

Each unit contains a unique private code generated at the factory, stored in the central database control unit, and unknown to anyone else. This may be randomly generated, and even be unknown to the unit owner, so long as the code specifically identifies a particular unit, and so long as the code permits the central database controller to connect to the terminal unit. Upon initial installation behind a FAX machine or FAX board, the FAX terminal automatically registers (after a verification process) its public key pair with the central database controller CDC. Once registered, any existing facsimile terminal can access this hardware key through its public key pair.

Prior to sending each FAX message, the FAX terminal first queries its local quick-access RAM for the public key of the FAX target. If the public key of the FAX target is found, by a positive comparison with the addressee information, the connection can be made. If the query comparison is negative, the sending FAX automatically calls the CDC, and after a verification process, the CDC transmits updating information to the quick-access storage of the sending FAX. This updating information includes the public key and the telephone number of the receiving fax; the receiving FAX uses this public key for the encryption and digital signature of the FAX message.

All new FAX units going on-line into the network must initially register with the CDC. The CDC thus has available in one of its memory units the public key registry for each new subscriber as well as the public key for each older subscriber. These new public keys and telephone numbers are immediately available, on demand, and in the general course of business are also sent to each facsimile terminal on a time-available basis, after hours. This is also true for updated facsimile terminal units which now have new FAXphone numbers in the CDC.

The next periodic after-hours update automatically checks and updates all of the existing phone numbers and public keys contained within each facsimile terminal unit. Note that each FAX updates and maintains its own internal table of FAXphone numbers and public keys.

The CDC is also responsible for the monthly billings, which may be transmitted encrypted.

COMMUNICATIONS MODES

The fax terminal offers a variety of communications modes. These are selected by the end-user from external setting switches on the FAX terminal case. These communications modes include:

1. No security.

2. No encryption required; signature required.

3. Encryption, no signature required.

4. Encryption required, signature required.

5. Encryption required, signature required, time-stamping required.

The source FAX unit FAX-1 transmits a communications mode identification and subsequently transmits a message to the selected target FAX according to the selected level of security. Tame-stamping of each page can be performed on each page by using the real-time clock of the FAX terminal hardware. Additional time-stamping capability is available by the time-stamping and storage of the encrypted FAX communication by the CDC 21. This is extremely secure since the CDC can time-stamp (and store) each page of the encrypted FAX message, but cannot read the message since the message is encrypted.

Each FAX maintains a record of the number of FAX pages that were sent each month, along with their level of protection, that is, along with a notation of their communication modes. Every month, each FAX terminal automatically dials into the CDC (after hours, generally late at night) and downloads this information for billing and audit trail maintenance purposes. Concurrently, the facsimile terminal checks and authenticates each of its locally stored telephone numbers and public keys with the CDC.

OPERATION

FIG. 1 shows the local database and control card which make up a secure FAX terminal 1. FAX1 includes FAX hardware and connections respectively to and from the FAX hardware. It also includes input and output connections to the CDC 2. FAX1 itself comprises a random access memory (RAM) 6 of suitable size to buffer input and output messages. It also comprises a read only memory (ROM) 4 for its operating firmware. Microcontroller 5, which carries out the functions demanded by its firmware coding in ROM 4, controls the flow of FAX data and also controls encryption and decryption.

Upon installation, pursuant to a one-time activation program, each new security FAX key will resister with the CDC, which will contain an associated public key for each telephone number assigned to a secure FAX. There will always be an associate private key for each local key. When a FAX message is transmitted, the FAX sender will first query its local database for the public key of the FAX recipient. If the public key is present, the FAX sender (FAX1) begins by sending a FAX message to the target FAX receiver (AF☐2), using the stored number, in encrypted fashion. The FAX1 unit dials the target FAX unit using the public telephone system or other non-secure communication channel. When the FAX message is transmitted, the public key for the target FAX receiver and the private key for the FAX sender are used for the encrypting of the data and the creation of a digital signature.

If the query to the local database is unsuccessful in locating the public key for the target FAX recipient, then a number-finding operation is set in motion. The FAX terminal will call the CDC for the phone number and public key to the target FAX unit, which in this example is FAX2.

Assuming the situation where the sending FAX (FAX1) already stores the public key for the target FAX (FAX2 ... FAX(n)) the transmission of an encrypted FAX message (e.g., "FAX1 [common]→k?\FAX(n)) is performed in the following steps:

1. The sending FAX (FAX1) generates a random key (k?).
2. FAX1 encrypts a concatenated secure address (<k?*kP>FAX(n=2).
3. FAX1 signs this message with the FAX1 private key kP>FAX1 and sends the encrypted message to FAX2.

Only FAX2 can decrypt the message with its private key and obtain the random key (k?) which it can then use to decrypt the message text. FAX1 and FAX2 verify random key (k?) during this transmittal.

1. Expanding FAX Security To Include All Modem Communications

Since both FAX and data communication involve the use of a modem, the central site security system requires little modification to be expanded from FAX to data communication, particularly since FAX communication is essentially data communication. Since the function of the modem is mainly to convert digital data to analog data (by the sender and from analog data to digital data (by the receiver) data transmitted via a modem, whether from the FAX or from a computer, is treated the same way. No distinction is made once the transmission of data occurs. Accordingly, no security, system modification is required by either the sending or receiving device or to the functioning of the central site. Then sending device will still search its internal database for the target phone number and public key, and query the central site if necessary/ The data transmission to the target site will be the same, regardless of the source or destination. Only the header message will be modified to include a new type of data-only flag.

Figure 3:
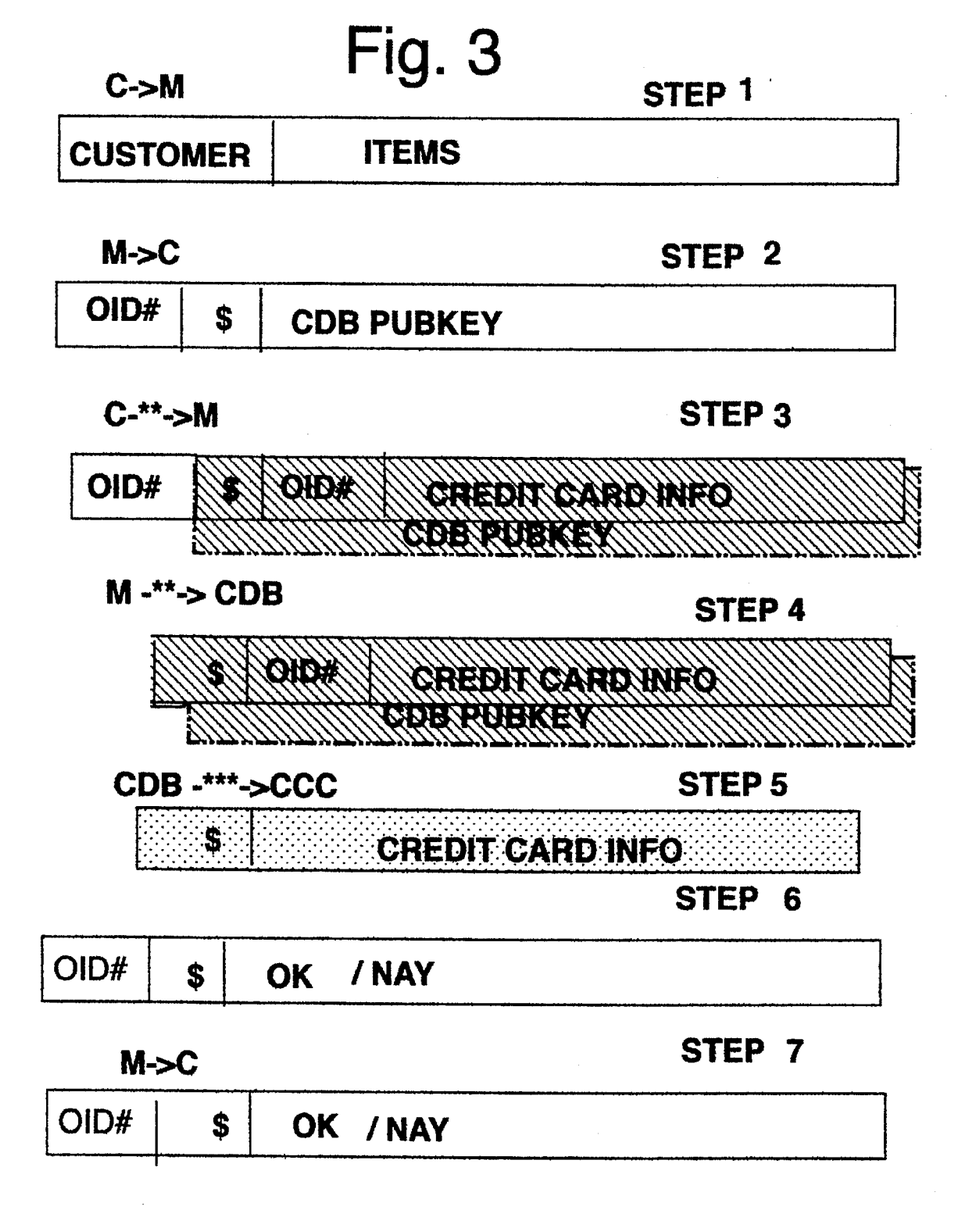
FIG. 3 is a diagram showing the method for using the central database controller to authorize charges to a credit card over a non-secure communications channel without ever putting the credit card number at risk without encryption.

2. Expanding Security To Include Modem Placement of Purchase Orders Encrypted on a Non-Secure Communication Medium FIG. 3 shows the method for authorizing credit card purchases via the Internet without risking the credit card number. Internet shopping is convenient and effective— security of the credit card is the major problem at present. The problem is that communication of the credit card number, in the clear, across a non-secure communications channel may provide sufficient data to a thief to steal the credit authorization codes.

In a typical transaction, customer views the offering information and determines interest in purchasing the item. Customer may transmit a purchase order, a digital signature providing authorization, and even transmit the credit card number. The transaction is quick and simple. Unfortunately, the credit card number may have been picked off by a thief.

Using the technique of this invention, the customer views the product offerings of the storekeeper, determines interest, and wires a purchase order with a digital signature providing authorization but does not transmit the credit card number, at least not in the clear. The Storekeeper acknowledges the customer's interest by transmitting the public key of the store together with an order identification (ID). The customer then encrypts and sends order, credit card type and number, credit card expiration date together with the encrypted order ID. The storekeeper now sends a request to the Central Data Base (CDB) to verify the card, amount and order ID with the credit card credit company. The CDB, after verification with the credit card credit company, sends to Storekeeper a "verified, accepted, and charged) message with the order ID. The storekeeper simply fills the order, depending upon the credit card credit company to reimburse the storekeeper and collect from the customer—but never did learn the actual credit card code number.

Method of Modem Placement of Purchase Orders Encrypted on a Non-Secure Communication Medium FIG. 3 shows the method for placing credit card purchase orders on a non-secure line, with the credit card number never put at risk—that is, the credit card number is never transmitted without encryption, and need not even be known by the storekeeper.

The method includes the following steps:

Step 1—Customer C and merchant M confer on non-encrypted communication channel to place an order for items. (C→M)

Step 2—Merchant M sends to customer C a data group including order identification number, total price, and the public key &the central database. (M→C)

Step 3—Customer C sends back to merchant M a data group including order identification number plus an encrypted data group including total price, order identification number and credit card information, using the CDB public key. (Merchant M cannot decrypt this encrypted data group.) (C-**→M)

Step 4—Merchant forwards to central database the complete message (minus the non-encrypted order identification number) from Step 3. (M-**→CDB)

Step 5—Central database queries credit availability from a credit provider, using its own secure or dedicated communication channel, and where establishes the validity of the credit transaction for the particular purchase order (OK) or invalidity (NAY).

Step 6—Central database sends back to merchant M, possibly encrypted, with a OK! or Nay!! for the order plus total dollar amount and order identification number. (CDB→M)

Step 7—Merchant M transmits OK or Nay for the order back to customer C, who has remained on line.

At no time during this entire process of seven steps does merchant M, much less any interlopers on the communication channel, have access to the actual credit card information.

The Central Site System
Important functional aspects of the system include:

1. Real-time communication with additional sites.
2. Rapid retrieval of data a and information.
3. Storage of all user accounts.
4. Ability to store and broadcast data to groups.
5. Maintenance of a billing system/
6. Storage of large quantities of data.
7. Maintenance and availability of demographic and company information.
8. High level of security using public key technology.

Definitions

For purposes of this invention, the xsystem central site, xsystem local-central site, xsystem storage control site and system data central site have definitions which differ slightly from the usual definitions of such sites, as follows:

Central Site: A repository of basic information consisting of public key, phone numbers and FAX numbers, able to respond to requests for public keys, communicate with other central sites encrypt data, store data, broadcast data, and perform security operations and numerous other functions.

Local Central Site: A central site in some localized region. (This term is used interchangeably with "central site" for purposes of the invention.)

Data Central Site: The repository for all demographic, company profile, group information, and billing information site assigned to one central site.

Storage Central Site: The repository for all stored and archived data.

Each local central site will be able to rapidly retrieve public key data based on a phone number. Each phone number and possibly an additional field will be compressed into a unique index number for both space and speed of retrieval purposes. Using this unique index, the system central site can rapidly access its database to find and then transmit the required public key once a secure connection is established.

Stored Data Transmission

Stored data will be transmitted pursuant to a request from the sender, along with the proper security sequence and request. All requests to release stored data must be verified before data is sent. The local archive index would then be accessed to either retrieve the archived file from local storage or if not there from the storage central a site. To ensure that each system central site would not get rapidly overloaded with this transmission of data which could take quite a while through standard phone lines, each system central site would download the appropriate data to a front end computer which would then download the data to the requester. In the case where requested archives were stored in both the local and storage central sites, the local site would download data to the requester before the storage central site to avoid any transmission conflicts.

Using front end computers for the downloading and uploading of data permits the storing and transmission of large amounts of data without taxing local site resources. It could also handle dedicated lines for this data transmission for companies that require large volumes of archived storage.

By necessity, the storage of data at the storage central site may become an enormous task. Companies with large amounts of data may want to use the storage central site as a repository or to even have the storage central site call into their system via a dedicated line and perform a remote backup operation. Doing this would require vast storage resources but would not tax any operations of the data central site. Additionally, many of these backup operations will be able to be performed via the front-end computers.

The Data Central Site

The data central site is the site of storage and search of all user account information. Whereas each central site will maintain a list of immediate information concerning FAX and telephone numbers and public keys for the rapid transmission of such key to the sending site, additional information will also be stored for each account. This information will reside in one large data central site and will contain much demographic information including: telephone number FAX number, company name, contact with room for multiple contacts, address, country, etc. Additional information can also be stored concerning all types of information including: key personnel, products services, name of company, billing information, SIC numbers, etc. Data site services will include the searching through the database according to any number or combination of criteria—for a fee. This fee will be based on the number of searches, the number of criteria, the particular infuriation, and the resulting list of names. The fee would also be dependent upon the mount of data provided in the resulting list and the number of required fields. Most of this data would be provided upon the registration of the sending hardware device. Upon receipt of the initial code, the central site would transmit a form either via FAX, modem, or the mail requiring registration information, additional company information would also be added from follow-up questionnaires (which accompany bills) and the entry of data from existing sources.

Billing

Billing will be performed on a monthly basis by the data central site. This will be automatically performed though a number of steps. Each month, the user site will automatically dial into its local central site and downloaded information concerning the number of public keys requested, the number of secure FAXes and total number of pages transmitted, the number of digital signatures requested, etc. The local central site will add additional information to this data to storage charges, time stamp charges, and store and forward charges acquired during monthly usage. Once data of all accounts is accumulated, this billing information will then be downloaded to the data central site in one large transmission stream. If data cannot be acquired from the user site, a fixed charge of $25 will be assigned. This charge will be adjusted the next time the user turns on their computer or FAX machine since the first task of the security device will be the sending of this data to the local site. If after 15 days, no data is still received by the local site, the user site will be notified, and the security device functioning will be suspended until this data is downloaded to the local central site.

Once all billing data resides in the data central site, billing can be automatically processed. Depending on account information, bills can be automatically printed and sent through the regular mail or sent via e-mail or by FAX Additional charges may also be accrued at the data central site for storage of data at that site, late charges, group maintenance, etc.

Summary of Central Site System

The central site system is comprised of several parts. At each user site is a security device capable of communicating via phone lines with a local central site. This communication via modem works similarly for both fax and computer data transmissions. Numerous central sites reside in "local" regions throughout the country with more able to be added, as needed. These central sites all perform the 'same series of tasks including: communication with the user site device, storing and time stamping of data, maintaining groups of data, etc. Each central site is supported by several front-end computers, capable of off-loading much of the system and transmission requirements from that particular central site. Each central site will communicate via a direct high-speed line with its adjoining central sites, the data central site will reside in only one place and will perform many specific tasks including the maintenance of all account and billing information. All billing will be performed from this site. Additionally, much of this account information can be queried (for a fee. The storage central site is the repository of most encrypted data, large files, storage data, etc. and also exists at one specialized site This site would also off-load and store data from any local central site. It could also maintain direct links to remote client sites for large (and scheduled) backups.

In conclusion, this central site system is a real-time, high-volume system. It can meet the needs of almost every business or individual and yet is highly secure and extremely not-intrusive. It is designed for flexibility, multiple functionality, and expandability. By utilizing state-of-the-art technology, it can provide a wide range of services and features and incorporate new features and services as the technology continues to develop.

CENTRAL DATABASE CONTROLLER

The central database controller (CDC) must perform may functions. Most importantly, it must securely maintain all of the public keys provided to each fax. The public key/private key concept is central to the entire security design.

The CDC functions as the repository of all the public keys in the central database. When first installed, each FAX automatically registers with public key with the CDC after the validation sequence is successfully completed. {The individual FAX maintains its own private key pair. This provides the CDC with the information—telephone number and public key—to maintain contact with all subscribing FAX terminal units.

The integrity of the CDC central database is mandatory for this system to work safely. It is therefore extremely important that the CDC first verify the FAX (sender or target) before proceeding with any further communications.

Verification

Assume that FAX1 intends to send a faxcom to FAX2, but does not possess the public key of FAX2. FAX1 simply calls the CDC and asks, by providing a very small message incorporating a random encryption key (k?) and FAX1 digital signature. The CDC then verifies the caller FAX ID by comparing it with the identified caller public key, uses k? to encrypt the responding information, and sends the FAX2 public key, encrypted with (k?) to FAX1.

BILLING, TIMESTAMPING AND SPECIAL FEATURES

The CDC is responsible for the billing of all services. The fax units are designed to dial automatically to the CDC on a monthly basis to update their internal public key and FAXphone number table and to provide billing information to the CDC on the number of secure FAX pages sent and their levels of security. The higher the security, the greater the fee for a unit of usage. A monthly subscriber fee may be charged, with unit-of-service billing for units of service above a threshold. Timestamping and archive storage may conveniently be charged on a unit of service basis.

Timestamping of data is an important service. Any user who requests timestamped, either by the document or each page, can have the message automatically sent to the CDC (in encrypted form). The CDC wilt then include the timestamp data superimposed on the FAX message before sending it to the target FAX terminal. The CDC may pass a copy of the message to archive storage, with the message still encrypted, including the timestamp.

Group or broadcast capability may also be located at the CDC or at the individual FAX terminal.

While the invention has been shown preferably in the form of a terminal unit communicating in a secure fashion with other terminal units over public telephone lines, stated alternatives such as dedicated lines may be used. Individual units are generically referred to as FAX units, but point-of-sale terminals or other devices which communicate fairy complex messages with a small or large amount of handshake return messages are included in the term "FAX," so long as the unit has communication capability over distance and has capability to operate with public and private keys and perform encryption/decryption functions. The alterations described, plus other changes which may be evident to those skilled in the art, are included within the spirit and scope of the invention as defined in the following claims.

I claim:
1. An encryption/decryption secure system for communication, via non-secure telecommunications, between a multiplicity of send/receive terminal units, comprising:
   a) a central database controller having a stored database, of access numbers indexed to public keys, for a full set of subscriber terminal units:
   b) a multiplicity of possible target terminal units at potential target locations, including a set of 1 to (n) to-be-selected target terminal units at respectively related selected target locations, each potential target terminal unit having an associated public key and associated private key respectively for access and encryption/decryption:
   c) a multiplicity of terminal units which are potential source units positioned at remote locations, including a source terminal unit at a source location, each local potential source terminal unit, including said source terminal unit, having an access number, an associated public key and an associated private key for access and encryption/decryption, said source terminal unit comprising:
      c.1) local quick-access storage means for storing a subset of said database of access numbers indexed to public keys of potential target terminal units;
      c.2) local means to query whether or not a selected target terminal unit, indexed by access number to an associate public key, is present in said local quick-access storage means, and to provided a quick-access determination indication; and
      c.3) means responsive to the quick-access determination indication of said local means to transmit timely to the selected target terminal unit, and alternatively to request from said central database controller the public key indexed to the access number of said target terminal unit.

2. An encryption/decryption secure system for communication, according to claim 1, which system operates in a plurality of communication modes, further comprising in said control means (c.2) of said selected source terminal unit:
   c.2.1) communication mode identification means, to cause transmission of a selected communication mode identification signal to said target terminal unit and to control transmission of subsequent related data to said selected target terminal unit according to the communication mode of said selected communication mode identification signal; and
   c.2.2) said potential target terminal units have means to process said subsequent related data according to said selected communication mode identification signal.

3. An encryption/decryption secure system for communication, according to claim 2, in which said communication control means (c.2) controls transmission of a mode identification signal which calls for encryption, and controls transmission of the related message in encrypted form.

4. A security encryption/decryption system communicating via non-secure telecommunication lines according to claim 3, further characterized in that said central database controller operates to timestamp and forward an encrypted message without capability to decrypt such message.

5. A security encryption/decryption system communicating via non-secure telecommunication lines according to claim 3, further characterized in that said central database controller operates automatically to carry out a subset of functions from the function set of timestamp, archive, group and forward an encrypted message without capability to decrypt such message.

6. An encryption/decryption secure system for communication, according to claim 1, which system operates in a plurality of communication forms, further comprising in said control means of said selected source terminal unit:

c.2.1) communication mode identification means, to cause transmission of a selected communication mode identification signal to said database controller and to said target terminal unit and to control transmission of subsequent related data to said selected target terminal unit according to the communication mode of said selected communication mode identification signal; and c.2.2) said potential target terminal units have means to process, including decryption, said subsequent related data according to said selected communication identification signal and said database controller having means except for decryption to process said subsequent related data according to said selected communication mode identification signal.

7. An encryption/decryption secure system for communication, via non-secure telecommunications, between a multiplicity of send/receive terminal units, according to claim 1, further characterized in that said central database controller operates to verify an encrypted credit card number and amount message from a source terminal by automatic communication with a credit database, and authorize the transaction to a selected target terminal unit, without forwarding the credit card number to said selected target terminal unit and without capability to decrypt such message.

8. An encryption/decryption secure system for communication, via non-secure telecommunications, between a multiplicity of send/receive terminal units, according to claim 7, further characterized in that said central database controller operates while said source terminal unit and said selected target terminal unit remain connected on a communication channel, to authorize a credit card transaction between said source terminal and said selected target terminal without the decrypted credit card number being made available to said selected target terminal or to said computer network.

9. In a secure system for communication via non-secure telecommunications, between a multiplicity of terminal units a security subsystem which operates in a plurality of communication modes, such security subsystem comprising:

a) a central database controller having a stored database, indexed to access numbers to retrieve public keys for a set of subscribers;

b) a multiplicity of potential target terminal units at potential target locations, including a to-be-selected target terminal unit at a selected target location, each potential target terminal unit having an associated public key and a private key respectively for access and encryption/decryption;

c) a multiplicity of terminal units, some of which may be potential target terminal units, which are potential source terminal units positioned at remote locations, including a source terminal unit at a source location, each local potential source terminal unit, including said source terminal unit, having an access number, an remote public key and an associated private key respectively for access and encryption/decryption, said source terminal unit comprising:

c.1) local quick-access storage means for storing a subset of said indexed database of access numbers for public keys of potential target terminal units; and c.2) local control means to determine whether or not a selected target terminal unit access number for its public key is available to said local quick-access storage means, said local control means further comprising:

c.2.1 communication mode identification means, to cause transmission of a selected communication mode identification signal requiring encryption and to control transmission of a related message to said selected target terminal unit encrypted according to the communication mode of said selected communication mode identification signal; and c.3) means responsive to said local control means, to determine whether to transmit directly to the selected target terminal unit.

10. A security encryption/decryption system communicating via non-secure telecommunications, among a multiplicity of send/receive terminal units, comprising:

a) a central database controller (2) having an indexed database, of access numbers for public keys, for a full set of subscriber terminal units:

b) a multiplicity of potential target terminal units at potential target locations, including a set of 1 to (n) to-be-selected target terminal units at respectively related selected target locations, each potential target terminal unit having an associated public key and associated private key respectively for access and encryption/decryption:

c) a multiplicity of potential source terminal units positioned at respectively related locations, including a source terminal unit at a source location, each local potential source terminal unit, including said source terminal unit, having an access number, an associated public key and an associated private key for access and encryption/decryption, said source terminal unit comprising:

c.1) local quick-access storage means for storing a subset of said database of access numbers indexed to public keys of potential target terminal units;

c.2) local means to query whether or not a selected target terminal unit, indexed by access number to an associate public key, is present in said local quick-access storage means, and to provided a quick-access determination indication; and c.3) means responsive to the quick-access determination indication of said local means to transmit directly to the selected target terminal unit, and alternatively to request from said central database controller the public key for the access number of said target terminal unit.

11. A security encryption/decryption system for communication between a multiplicity of FAX terminal units communicating via a non-secure communication system, characterized by a central database controller having stored a set of subscriber identifiers, each including the telephone numbers indexed to public keys for a full set of subscribers, said multiplicity of FAX terminal units including at least one source FAX unit at a source location and a multiplicity of potential target FAX units at other locations, including at least one selected target FAX unit, each potential target FAX unit including said target FAX unit having an associated public key and a private key respectively for access and encryption/decryption, all such source and potential target FAX units being connectable to each other and to said central database controller (2), said source FAX unit having a frequently-called-subscriber-list storage means for a subset of said set of subscriber identifiers, each including the telephone numbers for public keys of potential target FAX units, said source FAX unit having means to determine whether a selected target FAX unit subscriber identifier is stored in said frequently-called-subscriber-list storage means, and said source FAX unit having means to query said central database controller with the telephone number for the public key of a selected target FAX unit to provide the subscriber-identifier public key for a telephone number not present in said frequently-called-subscriber-identifier list storage means, further characterized by the deployment in the system of a plurality of levels of security including a encryption-level-of-security-identification when encryption is desired, each of said levels of security being identifiable by a level-of-security-identification signal, in which the source FAX unit transmits a level-of-security-identification signal along with a selection of target FAX unit and transmits a message to said selected target FAX unit according to said selected level-of-security-identification, in which said encryption-level-of-security-identification requires the message to be transmitted in encrypted mode, and in which said central database controller operates to provide additional services in the group of services comprising grouping, broadcasting, remote save, remote time stamping, archiving and billing, and forwarding an encrypted message without capability to encrypt such message.

12. The method for making a secure credit card transaction on a non-secure communication channel, including the following steps:

Step 1—Customer C and merchant M confer on non-encrypted communication channel to place an order for items;

Step 2—Merchant M sends to customer C a data group including order identification number, total price, and the public key of the central database;

Step 3—Customer C sends back to merchant M a data group including order identification number plus an encrypted data group including total price, order identification number and credit card information, using the CDB public key, Note: Merchant M cannot decrypt this encrypted data group;

Step 4—Merchant forwards to central database the complete message, minus the non-encrypted order identification number from Step 3;

Step 5—Central database queries credit availability from a credit provider, using its own secure or dedicated communication channel, and where establishes the validity of the credit transaction for the particular purchase order, or invalidity;

Step 6—Central database sends back to merchant M, possibly encrypted, with a OK or Nay for the order plus total dollar amount and order identification number;

Step 7—Merchant M transmits OK or NAY for the order back to customer C, who has remained on line.

* * * * *